US008838688B2

(12) United States Patent
Lin et al.

(10) Patent No.: US 8,838,688 B2
(45) Date of Patent: Sep. 16, 2014

(54) INFERRING USER INTERESTS USING SOCIAL NETWORK CORRELATION AND ATTRIBUTE CORRELATION

(75) Inventors: Ching-Yung Lin, Forest Hills, NY (US); Zhen Wen, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 13/118,726

(22) Filed: May 31, 2011

(65) Prior Publication Data

US 2012/0311030 A1    Dec. 6, 2012

(51) Int. Cl.
| | | |
|---|---|---|
| *G06F 15/16* | (2006.01) | |
| *G06Q 99/00* | (2006.01) | |
| *G06Q 30/00* | (2012.01) | |
| *G06Q 50/00* | (2012.01) | |
| *G06F 17/30* | (2006.01) | |
| *G06Q 30/02* | (2012.01) | |

(52) U.S. Cl.
CPC .......... *G06F 15/16* (2013.01); *G06F 17/30867* (2013.01); *G06Q 30/0269* (2013.01); *G06Q 50/01* (2013.01)
USPC ......... 709/204; 705/319; 705/14.66; 709/224

(58) Field of Classification Search
CPC ............... G06Q 50/01; G06Q 30/02–30/0284; G06F 17/30867
USPC ............... 709/204–207, 224; 705/319, 14.66, 705/14.67; 706/45–61
See application file for complete search history.

(56) References Cited

U.S. PATENT DOCUMENTS

| | | | |
|---|---|---|---|
| 5,704,017 A | 12/1997 | Heckerman et al. | |
| 5,937,397 A | 8/1999 | Callaghan | |
| 7,266,566 B1* | 9/2007 | Kennaley et al. ...................... 1/1 |
| 7,337,127 B1* | 2/2008 | Smith et al. ............... 705/14.66 |
| 7,689,452 B2 | 3/2010 | Lam et al. | |
| 2004/0138950 A1* | 7/2004 | Hyman et al. .................. 705/14 |
| 2005/0125390 A1* | 6/2005 | Hurst-Hiller et al. ............ 707/3 |
| 2005/0171877 A1* | 8/2005 | Weiss ............................... 705/35 |
| 2006/0247940 A1* | 11/2006 | Zhu et al. .......................... 705/1 |
| 2008/0005096 A1* | 1/2008 | Moore .............................. 707/5 |

(Continued)

OTHER PUBLICATIONS

Goldberg et al., "Using Collaborative Filtering to Weave an Information Tapestry," Commun. ACM, 35(12): 61-70 (1992).

(Continued)

*Primary Examiner* — Patrice Winder
*Assistant Examiner* — Julian Chang
(74) *Attorney, Agent, or Firm* — Ryan, Mason & Lewis, LLP

(57) ABSTRACT

Methods and apparatus are provided for inferring user interests from both direct and indirect social neighbors. User interests are inferred from social neighbors by exploiting the correlation among multiple attributes of a user, in addition to the social correlation of an attribute among a group of users. Attributes of a user are inferred by obtaining an inferred set of attributes comprised of one or more attributes of social neighbors of the user. Thereafter, the inferred set is modified using a user attribute correlation model describing a probability that the attributes in the inferred set co-occur on the user and one or more of the social neighbors. An inference quality of the obtained attributes can optionally be obtained based on social network properties of the social neighbors. Interactions with the user and/or the social neighbors can be employed to solicit feedback to improve the one or more inferred attributes.

20 Claims, 6 Drawing Sheets

(56) References Cited

U.S. PATENT DOCUMENTS

| | | | |
|---|---|---|---|
| 2008/0070209 A1 | 3/2008 | Zhuang et al. | |
| 2008/0126411 A1* | 5/2008 | Zhuang et al. | 707/104.1 |
| 2008/0199042 A1* | 8/2008 | Smith | 382/100 |
| 2009/0164897 A1* | 6/2009 | Amer-Yahia et al. | 715/703 |
| 2009/0210899 A1* | 8/2009 | Lawrence-Apfelbaum et al. | 725/34 |
| 2009/0299767 A1* | 12/2009 | Michon et al. | 705/3 |
| 2009/0319436 A1* | 12/2009 | Andra et al. | 705/80 |
| 2010/0094878 A1 | 4/2010 | Soroca et al. | |
| 2010/0106730 A1 | 4/2010 | Aminian et al. | |
| 2010/0332911 A1* | 12/2010 | Ramananda et al. | 714/45 |
| 2012/0023046 A1* | 1/2012 | Verma et al. | 706/12 |
| 2012/0042392 A1* | 2/2012 | Wu | 726/26 |
| 2012/0102523 A1* | 4/2012 | Herz et al. | 725/34 |
| 2012/0131034 A1* | 5/2012 | Kenedy et al. | 707/767 |
| 2012/0150772 A1* | 6/2012 | Paek et al. | 706/12 |
| 2012/0158630 A1* | 6/2012 | Zaman et al. | 706/21 |
| 2012/0166284 A1* | 6/2012 | Tseng | 705/14.58 |
| 2012/0166432 A1* | 6/2012 | Tseng | 707/728 |
| 2012/0166433 A1* | 6/2012 | Tseng | 707/728 |
| 2012/0166452 A1* | 6/2012 | Tseng | 707/749 |
| 2012/0166530 A1* | 6/2012 | Tseng | 709/204 |
| 2012/0191531 A1* | 7/2012 | You et al. | 705/14.42 |
| 2012/0218436 A1* | 8/2012 | Rhoads et al. | 348/222.1 |
| 2012/0221418 A1* | 8/2012 | Smith | 705/14.67 |

OTHER PUBLICATIONS

White et al., "Predicting User Interests From Contextual Information," SIGIR, 363-370 (2009).
Anagnostopoulos et al., "Influence and Correlation in Social Networks," KDD, 7-15 (2008).
Singla et at., "Yes, There is a Correlation:—From Social Networks to Personal Behavior on the Web," WWW, 655-664 (2008).
Mislove et al., "You Are Who You Know: Inferring User Profiles in Online Social Networks," WSDM, 251-260 (2010).
Jin et al., "A Bayesian Approach Toward Active Learning for Collaborative Filtering," Conference on Uncertainty in Artificial Intelligence (2004).
Boutilier et al., "Active Collaborative Filtering," Conference on Uncertainty in Artificial Intelligence (2003).
Brzozowski et al., "Effects of Feedback and Peer Pressure on Contributions to Enterprise Social Media," CSCW, 61-709 (2009).
Burke et al., "Feed me: Motivating Newcomer Contribution in Social Network Sites," CHI, 945-954 (2009).
Crandall et al., "Feedback Effects Between Similarity and Social Influence in Online Communities," KDD, 160-168 (2008).
Fleischer et al., "Tight Approximation Algorithms for Maximum General Assignment Problems," Proc. of SODA, 611-620 (2006).
Getoor et al., "Link Mining: A Survey," SIGKDD Explor. Newsl., 7:3-12 (2005).
Jensen et al., "Why Collective Inference Improves Relational Classification," Proc. of KDD, 593-598 (2004).
R.T. Leenders, "Modeling Social Influence Through Network Autocorrelation: Constructing the Weight Matrix," Social Networks, 24:21-47 (2002).
Li et al., "Opinion Observer: Analyzing and Comparing Opinions on the Web," Proc. of WWW, 342-351 (2005).
Li et al., "Tag Based Social Interest Discovery," Proc. of WWW, 675-684 (2008).
Liben-Nowell et al., "The Link Prediction Problem for Social Networks," CIKM, 556-559 (2003).
Lin et al., "Smallblue: People Mining for Expertise Search," IEEE Multimedia Magazine, 15(1): 78-84 (2008).
Ma et al., "Social Recommendation Using Probabilistic Matrix Factorization," CIKM, 931-940 (2008).
Millen et al., "Dogear: Social Bookmarking in the Enterprise," CHI, 111-120 (2006).
Piwowarski et al., "Predictive User CLick Models Based on Click-Through History," CIKM, 175-182 (2007).
Schmitz et al., "Mining Association Rules in Folksonomies," Data Schience and Classification: 10th IFCS Conf., 261-270 (2006).
Tang et al., "Social Influence Analysis in Large-Scale Networks," KDD, 807-816 (2009).
Wen et al., "On the Quality of Inferring Interests from Social Neighbors," KDD, 373-382 (2010).
Wen et al., "Toward Finding Valuable Topics," SDM, 720-731 (2010).
White et al., "Predicting User Interests from Contextual Information," SIGIR, 363-370 (2009).
Wu et al., "Value of Soc. Network—a Large-Scale Anal. on Network Structure Impact to Fin. Revenue of Info. Tech. Consultants," Winter Conf. on Bus. Intelligence (2009).
Kleinbert et al., "On the Value of Private Information," Cornell University, ww.eecs.Berkeley.edu/christos/tark.ps.
Shardanand et al., "Social Information Filtering: Algorithms for Automating 'Word of Mouth,'" Proc. ACM SIGCHI Conf. on Human Facots in Computing Systems, 210-217 (1995).
Kumar et al., "Recommendation Systems: A Probabilistic Analysis," Foundations of Computer Science, Proceedings, 39th Annual Symposium, 664-473, 8-11 (1998).
Balabanovic et al., "Content-Based, Collaborative Recommendation," In Conference on Human Factors in Computing Systems—CHI '95 (1995).

* cited by examiner

```
Procedure  OptimizeInterests(A₀)
1  A ← emptySet
2  maxReward ← max_{j∈A₀}[reward(j, A, A₀)]
3  maxJ ← argmax_{j∈A₀}[reward(j, A, A₀)]
4  while maxReward > 0
5     insert maxJ into A
6     delete maxJ from A₀
7     maxReward ← max_{j∈A₀}[reward(j, A, A₀)]
8     maxJ ← argmax_{j∈A₀}[reward(j, A, A₀)]
9  return A
```

INFERRING USER INTERESTS USING SOCIAL NETWORK CORRELATION AND ATTRIBUTE CORRELATION

STATEMENT OF GOVERNMENT RIGHTS

This invention was made with Government support under Contract No.: W911NF-09-2-0053 awarded by Army Research Office (ARO). The Government has certain rights in this invention.

FIELD OF THE INVENTION

The present invention relates generally to the electrical, electronic and computer arts, and, more particularly, to improved techniques for inferring user interests from social neighbors.

BACKGROUND OF THE INVENTION

A user's interests and attributes may be inferred from his or her social neighbors. See, for example, A. Mislove et al., "You Are Who You Know: Inferring User Profiles in Online Social Networks," ACM Web Search and Data Mining Conf., 251-60, (2010). A user's social neighbors refer to the people that he or she interacts with via any communication methods (e.g., face-to-face meeting, email or online social networks). Such inferred interests can enable applications to provide personalized results to meet individual user needs, even when the user is new to an application.

Recently, the proliferation of online social networks has sparked an interest in leveraging social network information to infer the interests of a user, based on the existence of social influence and correlation among neighbors in social networks. For applications that can directly observe a user's behavior (e.g., search engine logs), inferring interests from the user's friends in social networks provides potentially useful enhancements. For many other applications, however, it is difficult to observe sufficient behavior of a large number of users.

In such scenarios, inferring user interests from social neighbors can be the only viable solution. For example, for a new user in a social application, the application may only have information about the user's friends who are already using the application. To motivate the new user to actively participate, the application may want to provide personalized recommendations of relevant content. To this end, the application may infer interests of the user from his or her friends.

It is, however, challenging to obtain consistently high quality results in inferring user interests from social neighbors. See, for example, Z. Wen and C.-Y. Lin, "On the Quality of Inferring Interests From Social Neighbors," ACM Conf. on Knowledge Discovery and Data Mining, 373-82 (2010). The inference quality can vary significantly due to several factors. First, users may not use social applications intensively to leave enough traces to reveal about their social interactions. For example, only a small percentage of users may actively contribute social content using one or more social software tools (e.g., blogs and social bookmarking). Second, users may only reveal a small subset of possible attributes. Different attributes may have a different impact on inferring interests based on social correlation. For example, the social correlation of a group of college students' ages can be much higher than the correlation of their hometowns. In addition, high quality inference results may only be achieved for a small subset of users.

A need therefore remains for improved methods and apparatus for inferring user interests from both direct and indirect social neighbors. A further need exists for inferring user interests from social neighbors by exploiting the correlation among multiple attributes of a user, in addition to the social correlation of an attribute among a group of users.

SUMMARY OF THE INVENTION

Generally, improved methods and apparatus are provided for inferring user interests from both direct and indirect social neighbors. User interests are inferred from social neighbors by exploiting the correlation among multiple attributes of a user, in addition to the social correlation of an attribute among a group of users. According to one aspect of the invention, one or more attributes of a user are inferred by obtaining an inferred set of attributes comprised of one or more attributes of social neighbors of the user. Thereafter, the inferred set is modified using a user attribute correlation model describing a probability that the attributes in the inferred set co-occur on the user and one or more of the social neighbors. An inference quality of the obtained attributes can optionally be obtained based on social network properties of the social neighbors.

The inferred set can be modified, for example, by selecting a set of social neighbors and selecting a set of attributes of the selected set of social neighbors. The selection of a set of social neighbors may involve selecting social neighbors based on a social influence model, and/or selecting social neighbors that are active. The selection of a set of attributes employs the user attribute correlation model to select a set of unknown attributes of the one or more of the social neighbors to ask the user about.

Another aspect of the invention provides interactions with the user and/or the social neighbors to solicit feedback to improve the one or more inferred attributes.

A more complete understanding of the present invention, as well as further features and advantages of the present invention, will be obtained by reference to the following detailed description and drawings.

BRIEF DESCRIPTION OF THE DRAWINGS

FIG. 3 is pseudo code illustrating an exemplary greedy algorithm for refining inferred attributes obtained by social correlation using attribute correlation in accordance with the present invention;

DETAILED DESCRIPTION OF PREFERRED EMBODIMENTS

Figure 1:
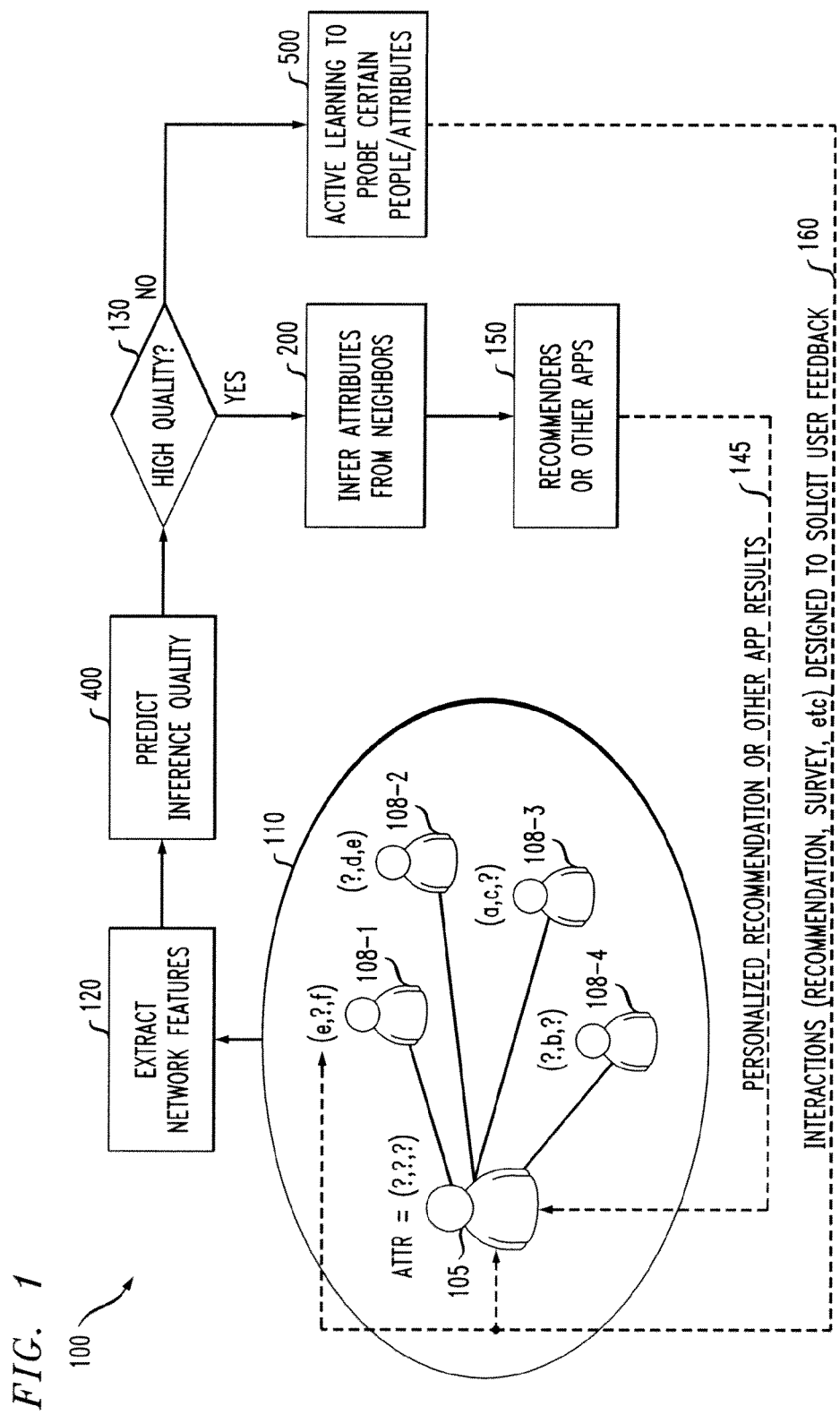
FIG. 1 illustrates an exemplary algorithm for refining inferred attributes obtained by social correlation using attribute correlation in accordance with the present invention.

The present invention provides improved methods and apparatus for inferring user interests from social neighbors. According to one aspect of the invention, the inference of user interests from social neighbors is improved by exploiting the correlation among multiple attributes of a user, in addition to the social correlation of an attribute among a group of users. Social correlation is used to obtain initial inferences from neighbors. The initial inferences are refined using attribute correlation (user interests) to remove less likely attribute combinations. In this manner, social correlation is combined with attribute correlation to infer user interests from social neighbors.

Social Relationship Modeling

Relative to online social software, traditional communication media (e.g., email, instant messaging) provide better accuracy in inferring social networks, since most people still spend significant time using these media, especially in a work-place context. Therefore, the strength of people's social relationship is modeled based on communications in these media. A volunteer's communication may include non-contributors. Thus, the exemplary system can infer the connections and the amount of communications to the non-contributors. The social networks of a group of users are derived, where the strength of a link is computed based the amount of communication between two people. Specifically, the strength of a link is calculated as follows:

$$dist(i, j) = k - \sum_{k=1}^{k-1} \frac{1}{strength(v_{k1}v_{k+1})} \quad (1)$$

where $v_1, \ldots v_k$ are the nodes on the shorted path from user i to user j, and strength $(v_k, v_{k+1})$ measures the strength of communications between $v_k$ and $v_{k+1}$ and is normalized to vary between 0 and 1. The measure is defined as follows:

$$strength(i, j) = \frac{\log(X'_{ij})}{\max_j \log(X'_{ij})} \quad (2)$$

where $X_{ij}'$ is as follows:

$$X'_{ij} = \begin{cases} 10: & \text{if } X_{ij} \le 10 \\ X_{ij}: & \text{otherwise} \end{cases}$$

Here, $X_{ij}$ is the total outgoing communications from user i to j. This measure of communication strength has been extensively tested and is shown to accurately reflect the strength of ties between users.

User Interest Models

Two types of user interests are of particular interest: (1) implicit interests indicated by user content; and (2) explicit interests directly specified by users in their profiles. For each type, metrics are defined to measure the quality of inferred interests against ground truth.

Topic-Based Implicit User Interest Model

Users' contributed content reveals their implicit interests. Thus, user interests are modeled as a set of latent topics extracted from their communication data and contributed social content. Latent Dirichlet Allocation (LDA) (D. Blei et al., "Latent Dirichlet Allocation," J. of Machine Learning Research, 3, 993-1022 (2003)), a generative probabilistic model, is used to extract, for example, 1200 topics. The exemplary extracted topics range from projects, business processes and client issues to business travel, conferences and meetings. Then, the user's implicit interests can be represented by a U×T matrix S, where U is the total number of employees. An element $s_{ij}$ in S denotes the degree the i-th employee is interested in the j-th extracted topic. For a more detailed discussion, see Z. Wen and C.-Y. Lin, "On the Quality of Inferring Interests From Social Neighbors," ACM Conf. on Knowledge Discovery and Data Mining, 373-82 (2010), incorporated by reference herein.

To measure the quality of a user's inferred implicit interests, it can be defined as follows:

$$q = \frac{1}{N} \sum_{j=1}^{N} \frac{\max[\cos(t_j, t')]}{t' \in T'_N} \quad (3)$$

where $t_j$ is the j-th topic in the inferred top-N interests, $T'_N$ is the ground-truth top-N interests, and $\cos(t_j, t')$ is the cosine similarity. Intuitively, the equation calculates how many inferred top-N interests are similar to the top N ground truth. In an exemplary implementation, N equals 10 and the interests extracted from a user's contributed content are used as the user's ground-truth implicit interests.

Explicit User Interest Model

User interests can also be explicitly specified in their profiles. In one exemplary enterprise user group, employees are encouraged to specify information preferences indicating their interests in their online profiles. The interests are specified using terms from a manually designed taxonomy. A subset of users will specify their interests. For example, out of approximately 25,000 exemplary users that contributed social content, 8,000 of them also explicitly specified interests. A vector of terms is used as a user's interest model. The default weight of a term is 1, since the terms specified in profiles are neither weighted nor sorted.

For the explicit interests, the quality of a user's inferred interests is measured by how much the inferred interests overlap with the ground truth. Formally, the quality is measured by precision and recall defined as follows:

$$Q_p = \frac{|INF \cap GND|}{|INF|}, \quad Q_r = \frac{|INF \cap GND|}{|GND|} \quad (4)$$

where INF is the set of terms with positive weights in the user's inferred explicit interests, and GND is the ground truth of the user's explicit interests as specified in his or her profile.

Improving User Interest Inference from Neighbors

Users typically maintain social relationships with a diverse set of social neighbors. Different aspects of their behavior and interests may be influenced by different social neighbors. Therefore, a user may not have all of his or her neighbors' interests. The present invention improves user interest inference by exploiting attribute correlation to remove less likely combinations of interests/attributes.

FIG. 1 illustrates an exemplary algorithm 100 for refining inferred attributes obtained by social correlation using attribute correlation in accordance with the present invention.

As shown in FIG. 1, the exemplary algorithm 100 infers one or more attributes (attr) for a user 105 who has a social network 110 comprised of a plurality of social neighbors 108-1 through 108-4. The exemplary algorithm 100 processes social network data, such as electronic communication data (such as email and instant messaging activities), Web 2.0 social content and structured employee profile information, such as the division an employee belongs to, job role within the division, and the generated revenue.

Initially, as discussed further below in conjunction with FIG. 4, the exemplary algorithm 100 extracts network features during step 120, such as social neighbor features such as profile and shared information, and social network features, such as in-degree and betweenness.

Thereafter, as discussed further below in conjunction with FIG. 4, the exemplary algorithm 100 predicts the inference quality during step 400. A test is perforated during step 130 to determine if the inference quality exceeds a predefined threshold. Z. Wen and C.-Y. Lin, referenced above, propose using an inference quality predictor, that predicts how good the inference will be based on social network features. Then, the inferred interests of a user are only used when the predictor gives sufficiently good estimates.

If it is determined during step 130 that the inference quality exceeds the predefined threshold, then program control proceeds to step 200 to infer user attributes based on social neighbors, as discussed further below in conjunction with FIG. 2. The inferred user attributes generated during step 200 are applied to recommenders or other applications during step 150 to generate personalized recommendations for the user 105 or other application results 145.

If, however, it is determined during step 130 that the inference quality does not exceed the predefined threshold, then an active learning technique is applied during step 500, as discussed further below in conjunction with FIG. 5, to probe the user for certain feedback, such as neighbors (users) and/or attributes. The interactions 160 are designed to solicit user feedback to obtain missing information.

Figure 2:
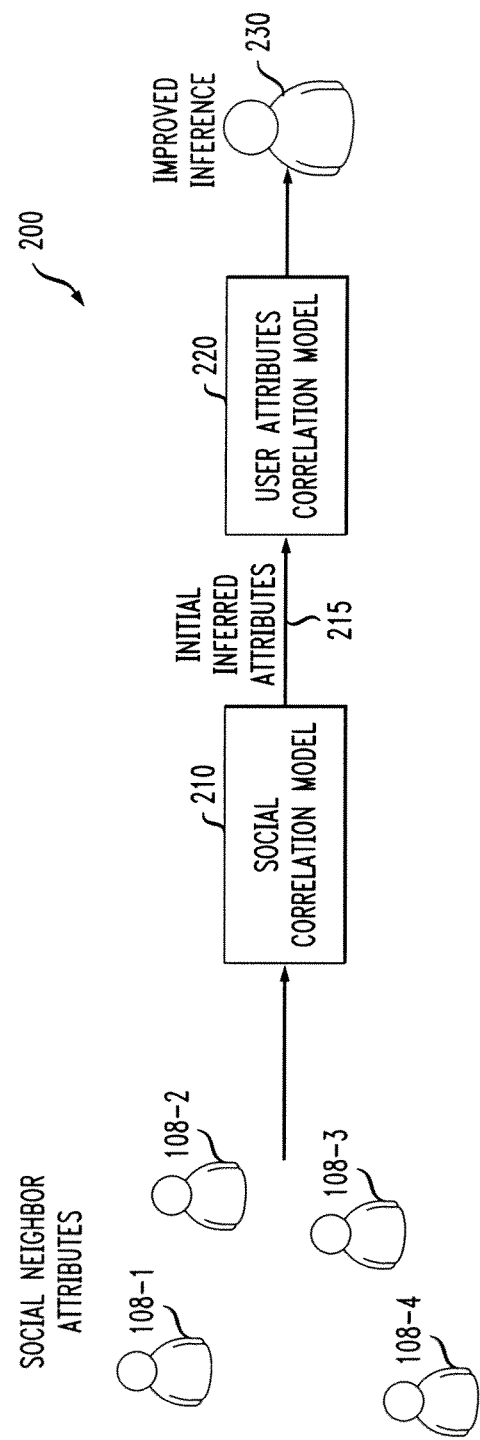
FIG. 2 is a flow diagram of an exemplary inference algorithm for inferring one or more user attributes from social neighbors in accordance with the present invention.

FIG. 2 is a flow diagram of an exemplary inference algorithm 200 for inferring one or more user attributes from social neighbors 108 in accordance with the present invention in further detail. As shown in FIG. 2, the exemplary inference algorithm 200 initially applies a social correlation model 210, discussed below in the section entitled "Inferring Interests by Social Correlation," that describes the correlation between a user 105 and his social neighbors 108, such as a network autocorrelation model. The social correlation model 210 provides a set of initial inferred attributes 215.

The initial inferences 215 are refined during step 220 using attribute correlation (user interests) to remove less likely attribute combinations. In particular, a User Attribute-Correlation Model 220 discussed below in the section entitled "Improving Inference by Attribute Correlation," is applied that describes the probability that a set of attributes are of a user 105 and his or her neighbors 108, also referred to herein as "attribute correlation." For example, in a user's attributes, the term "social software" is more likely to co-occur with the word "web" than with the word "VLSI." The attribute correlation yields improved inferences 230.

Inferring Interests by Social Correlation

To infer users' interests, variable Z denotes the degree users are interested in a set of attributes, where $z_{ij}$ is the i-th user's interest in the j-th attribute. The attribute can be a topic in the implicit user interests or a term in the explicit user interests. For the topic-based implicit user interests, $z_{ij}=s_{ij}$, where $s_{ij}$ is an entry of the matrix S defined above. Using a network autocorrelation model, $z_{ij}$ is estimated as follows:

$$z_{ij} = B\sum_{k=1}^{U}(w_{ki} \cdot z_{kj}) \quad (5)$$

where B is a constant for normalizing $z_{ij}$ to lie between [0, 1], $z_{kj}$ is initially set to 0 if the attributes of the k-th user can not be observed. The weight $w_{ki}$ is further defined as an exponential function of the social distance $$w_{ki}=\exp(-\mathrm{dist}(k,i)) \quad (6)$$

where dist(k, j) is the social distance between user k and user i defined in Equation 1.

The quality of inference may not be reliable using only the social correlation model. For example, Z. Wen and C.-Y. Lin, "On the Quality of Inferring Interests From Social Neighbors," ACM Conf. on Knowledge Discovery and Data Mining, 373-82 (2010), found that the mean quality of exemplary inferred implicit interests was 45.1%, and the variance was as large as 21.7%. As discussed above in conjunction with step 130 (FIG. 1), Z. Wen and C.-Y. Lin propose using an inference quality predictor, which predicts how good the inference will be based on social network features. Then, the interests of a user are inferred only when the predictor gives good estimates. The exemplary results showed that this technique improves the mean quality of inferred implicit interests to 64.4%, but only for about 5% of the users.

Improving Inference by Attribute Correlation

Users typically interact with different sets of people for different things. In other words, they can participate in a diverse set of communities where interests/attributes in each community may be quite different. In this situation, the interests of a particular user may not be the union of the interests from all his or her communities, as the simple social correlation model discussed above would suggest. Instead, his or her interests are likely to be a subset of the union. On the other hand, previous data mining research on association rules have shown that interesting correlations can be discovered among attributes in large datasets. The present invention exploits such attribute correlation to refine inferred attributes obtained by social correlation.

The correlation between the j-th attribute and the k-th attribute are computed as the Pearson correlation coefficient:

$$r_{jk} = \frac{U\sum_i z_{ij}z_{ik} - \sum_i z_{ij}\sum_i z_{ik}}{\sqrt{U\sum_i z_{ij}^2 - \left(\sum_i z_{ij}\right)^2}\sqrt{Ui\sum_i z_{ik}^2 - \left(\sum_i z_{ik}\right)^2}}$$

where $z_{ij}$; and $z_{ik}$ are the j-th and the k-th attributes of user i, respectively.

Then, given an initial set of attributes $A_0$ inferred based on social correlation for user i, the optimal subset $A=\langle a_1, \ldots, a_n\rangle$ is found by balancing three constraints in an exemplary embodiment. First, the total degree of interests on attributes in A (i.e., $\Sigma_{i=1}^{n} z_{i,ak}$) should be maximized. Next, the overall pair-wise attribute correlation in A (i.e., $\Sigma_{k\neq j}\Sigma_{j-1}^{n} r_{jk}$) should be maximized. Finally, a smaller size of A (i.e., len(A)) should be favored, if everything else is equal (i.e., Occam's razor principle). This optimization can be formulated as a generalized assignment problem, which is NP-hard. Therefore, a greedy approach is used in an exemplary embodiment to approximating the optimization.

Greedy Algorithm

FIG. 3 is pseudo code illustrating an exemplary greedy algorithm 300 for refining inferred attributes obtained by social correlation using attribute correlation in accordance with the present invention. The exemplary greedy algorithm 300 employs a reward function to measure the desirability of selecting an attribute from $A_0$ to add to the target optimal subset A. For the i-th user's attribute j in $A_0$, the reward function is:

$$\text{reward}(j, A, A_0) = o_1 \cdot z_{ij} + o_2 \cdot \text{AttrCorr}(j, A, A_0) - o_3 \cdot \text{len}(A) \qquad (7)$$

where $\text{AttrCorr}(j, A, A_0)$ measures the attribute-correlation-based desirability of attribute j given $A_0$ and current A, and $o_1$, $o_2$ and $o_3$ are weights controlling the relative importance of the three factors. $\text{AttrCorr}(j, A, A_0)$ is defined as follows:

$$\text{AttrCorr}(j, A, A_0) = \begin{cases} \frac{1}{T}\sum_{k=1}^{T} T_{jk} : & \text{if } A \text{ is empty} \\ \frac{1}{\text{len}(A)}\sum_{a \in A} T_{ja} : & \text{otherwise} \end{cases}$$

where T $\text{len}(A_0)$, the total number of attributes. The intuition of $\text{AttrCorr}(j, A, A_0)$ is that the best initial seed candidate is the attribute with the highest correlation with all the other attributes. Such seed candidate may be more likely to produce results with strong pair-wise attribute correlation. As the optimal set A grows, the best candidate is selected as the attribute that has the highest correlation with attributes already in A.

For weights $o_1 + o_2 + o_3 = 1$. In one exemplary implementation, $o_3 = 0.05$ to favor result sets with size less than 20, since many practical search and recommender applications focus on users' top interests (e.g., top 20). Next, two weighting strategies for $o_1$ are described in the next sub-section. Finally, $o_2$ can be computed as $1 - o_1 - o_3$.

Weighting Schemes

Two weights $o_1$ and $o_2$ control the relative importance of the social and attribute correlation.

Fixed Weights

A simple scheme is to use fixed values for $o_1$ and $o_2$ during the optimization process. In various exemplary implementations, the quality of inference can be evaluated under different values of the weights.

Dynamic Weights

Social correlation is generally more important at the initial stage of the inference, since no attributes are known for a user. However, as more attributes are inferred for the user, attribute correlation may provide more cues than social correlation. Therefore, a dynamic weighting scheme for $o_1$ may work better than fixed weights. To this end, an exponential decay can be used for $o_1$. Moreover, the decay can depend on the usefulness of the attribute correlation to inference. A possible usefulness indicator can be the distribution of attribute correlation values. For example, a distribution with more non-zero values may provide more useful inputs to the inference algorithm 300. Thus, the attribute correlation distributions are fit to exponential distributions and the exponent b (b<0) is used as the usefulness indicator. A larger b value means a heavier tail and thus more non-zero values can be used as cues for the inference algorithm 300. Then, $$o_1 = \exp(c \cdot b \cdot \text{len}(A)) \qquad (8)$$

where c is a constant to be determined in experiments.

In addition, the weights may be affected by the diversity of a person's network. For example, if s/he has very diverse social neighbors, her/his attributes inferred based on social correlation can be very diverse too. For such users, the attribute correlation can be more important in identifying likely combinations of attributes. A network diversity metric is used to measure the degree to which nodes have diverse contacts (i.e., social neighbors) in a network. For an individual i, the contacts of i are considered diverse if they are not connected to each other. By having diverse contacts, an individual may tap into diverse and novel information sources. Nevertheless, s/he may selectively develop interests from the social neighbors' influence due to his or her limited capacities to cope with large amount of information. Formally, the network diversity of i is defined as:

$$d(i) = 1 - \sum_{l}\left(\rho_{il} + \sum_{m \neq i, l} \rho_{im} \cdot \rho_{ml}\right)^2 \qquad (9)$$

where $\rho_{il}$ is the proportion of node i's network efforts invested in communicating with node l. Small values of d(i) indicate that the neighbors of node i are highly connected to each other. Thus, node i's contacts are considered concentrated instead of diverse. Then, Equation 8 can be augmented as follows:

$$o_1 = \exp(c \cdot d(i) \cdot b \cdot \text{len}(A)) \qquad (10)$$

Improving Inference with Quality Predictor The improved user interest inference algorithm 300 can also be used together with an inference quality predictor such as the one proposed in Z. Wen and C.-Y. Lin, ACM Conf. on Knowledge Discovery and Data Mining, 373-82 (2010).

Figure 4:
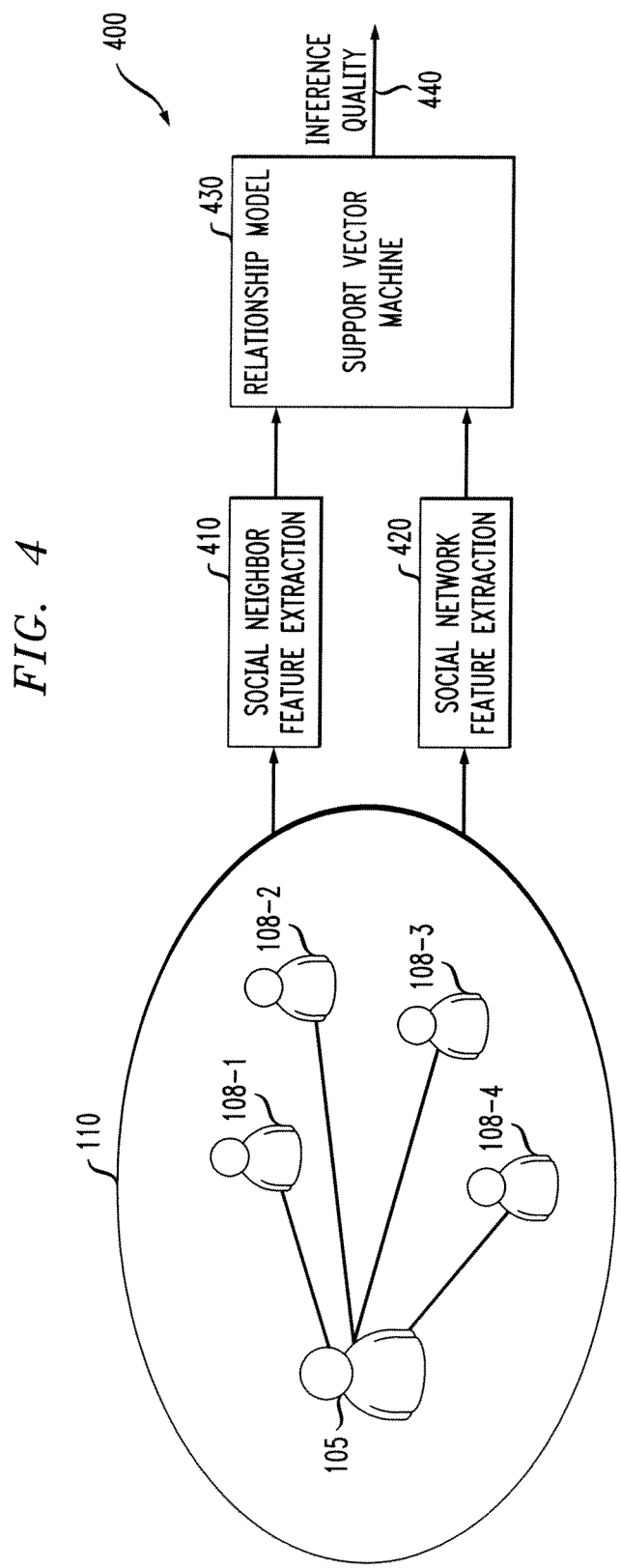
FIG. 4 is a flow chart of an exemplary algorithm for performing network feature extraction and determining a corresponding inference quality.

FIG. 4 is a flow chart of an exemplary algorithm 400 for performing network feature extraction and determining a corresponding inference quality. As shown in FIG. 4, the algorithm 400 performs feature extraction for a user 105 having a social network 110 comprised of a plurality of social neighbors 108-1 through 108-4. The exemplary algorithm 400 extracts social neighbor features during step 410, such as profile and shared information. In addition, the exemplary algorithm 400 extracts social network features, such as in-degree and betweenness, during step 420.

A support vector machine (SVM) models the relationship between features and inference quality during step 430, to predict the inference quality 440. In an exemplary embodiment, a particular type of SVM called support vector regression (SVR) is used. In SVR, the input x is first mapped onto a high dimensional feature space using a nonlinear mapping, and then a linear model is constructed in this feature space. SVR uses a so-called $\epsilon$-insensitive loss function:

$$L_\epsilon = \begin{cases} 0 & \text{if } |y - f_\omega(x)| < \varepsilon \\ |y - f_\omega(x)| & \text{otherwise} \end{cases}$$

where $\epsilon$ is a predefined deviation threshold, and $f_\omega(x)$ is the regression function to predict y which has a parameter. As used herein, input x is the network features, and output y is the inference quality. Then, the regression is formalized as the following problem:

$$\text{minimize } \frac{1}{2}\|\omega\|^2 + H\sum_{i=1}^{l}(\xi_i + \xi_i^*)$$

$$\text{subject to } \begin{cases} y_i - f_\omega(x) \le \varepsilon + \xi_i \\ f_\omega(x) - y_i \le \varepsilon + \xi_i^* \\ \xi_i, \xi_i^* \ge 0 \end{cases}$$

where H is a constant, and $\xi_i$, $\xi_i^*$ (i=1; : : : ; l) are slack variables introduced for the optimization to measure the deviation of training samples outside $\varepsilon$ insensitive zone.

Such predictor estimates predict inference quality 440 based on observed social network features (e.g., network in-degree, out-degree, betweenness centrality, etc.), in order to allow search and recommendation applications to make informed decisions on when to utilize inferred user interests. Z. Wen and C.-Y. Lin showed that significantly higher inference quality can be achieved for users identified by the predictor. It is natural to assume that using the inference quality predictor will further improve the performance of the disclosed approach, since the two are complementary. However, the users identified by the predictor are the ones for whom we can observe strong social correlation. Therefore, the contribution of attribution correlation may be relatively small, in terms of improving inferring user interests.

The present invention also recognizes that the more attributes there are, the more likely an attribute may be correlated with other attributes. Thus, the disclosed approach may better exploit attribute correlation to improve inference as the number of attributes increases.

As previously indicated if it is determined during step 130 (FIG. 1) that the inference quality 440 does not exceed the predefined threshold, then an active learning technique is applied during step 500. As discussed hereinafter, the active learning technique probes the user for certain feedback, such as neighbors (users) and/or attributes, to obtain missing information.

Figure 5:
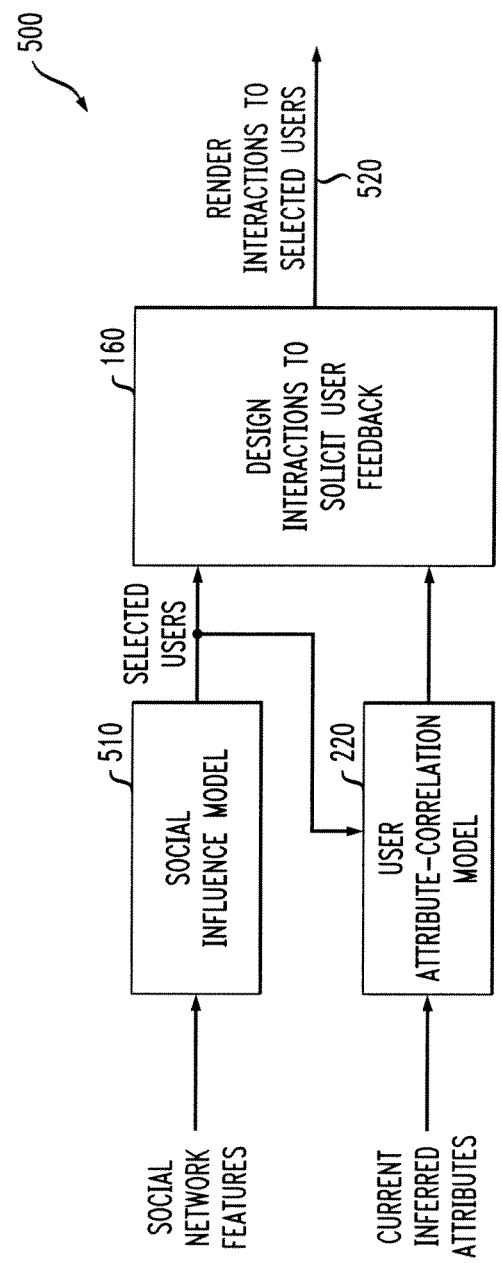
FIG. 5 is a flow chart of an exemplary active learning process incorporating features of the present invention.

FIG. 5 is a flow chart of an exemplary active learning process 500 incorporating features of the present invention. As shown in FIG. 5, the exemplary active learning process 500 initially applies a social influence model to the social network features during step 510. Generally, the social influence model aims to identify a set of neighbors 108 that have high social influence on the target user 105. Therefore, there can be high social correlation between social neighbors 108 and the target user 105. For example, the social influence model aims to identify a set of neighbors 108 that have high social influence in the social network 110 that may give valuable feedback.

Thereafter, a user attribute-correlation model 220 is applied to the selected users, as well as the current inferred attributes. The user attribute-correlation model 220 selects a set of unknown attributes of the selected neighbors 108 to ask the user about, using attribute correlation. Generally, the set of unknown attributes of neighbors 108s should have a high probability to co-occur for the target user's unknown attributes. A set of user interactions 160 are designed and rendered (520) to solicit user feedback to obtain the set of unknown attributes.

The exemplary disclosed user interest inference algorithms can be used, for example, to improve personalized services and privacy control.

Improving Personalized Services

Social and attribute correlation complement each other in improving interest inference. For applications aiming to provide personalized services, a few attributes with strong social correlation can provide a good starting point for inferring user interests. Then, other attributes can be effectively inferred by exploiting attribute correlation. To this end, these applications would benefit from not only more observations of users' relationships, but also more aspects of user activities.

Improving Privacy Control

Users usually want to control the information that is shared about themselves. However, it becomes challenging as research has shown that such information may be inferred from their social neighbors. Moreover, different social neighbors of a user may use different social applications. Thus, these applications have different sets of observations on people's attributes and their networks. As a result, these applications would have different capabilities of inferring attributes of the user.

To assist users to achieve better privacy control in such complex situations, the disclosed technique can be used to show users how well each of their attributes can be inferred by each of the applications. For each attribute that they want to keep private, the users can be shown ranked lists of correlated social neighbors and attributes. Then, the users can mark private these correlated attributes, as well as the relationships to the social neighbors. During this process, the disclosed technique may be used to keep updating the display of the inferred attributes as well as the inference quality. Such feedback can help the users to make sure that their privacy goals are achieved.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
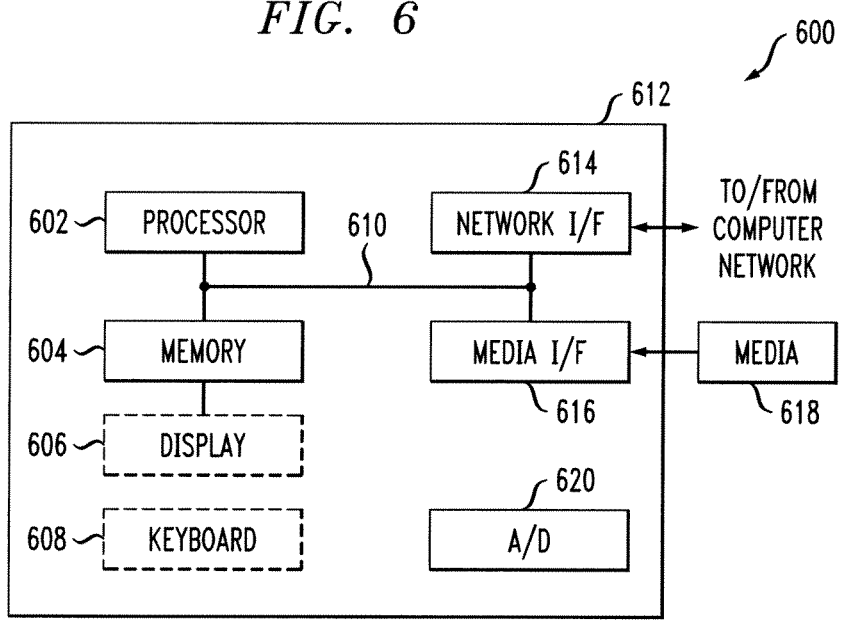
FIG. 6 depicts a computer system that may be useful in implementing one or more aspects and/or elements of the present invention.

One or more embodiments can make use of software running on a general purpose computer or workstation. FIG. 6 depicts an exemplary multi-faceted visualization tool 600 that may be useful in implementing one or more aspects and/or elements of the present invention. With reference to FIG. 6, such an implementation might employ, for example, a processor 602, a memory 604, and an input/output interface formed, for example, by a display 606 and a keyboard 608.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Analog-to-digital converter(s) 620 may be provided to receive analog input, such as analog video feed, and to digitize same. Such converter(s) may be interconnected with system bus 610.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 602. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for inferring one or more attributes of a user, comprising:
   obtaining an inferred set of attributes for said user comprised of one or more attributes of social neighbors of said user in a social network:
   predicting an accuracy of said obtained inferred set of attributes for said user; and
   if said predicted accuracy does not satisfy a quality threshold, then modifying said inferred set for said user using a user attribute correlation model describing a probability that at least two of said attributes in said inferred set co-occur on any one user among users of said social network.

2. The method of claim 1, further comprising the step of estimating an inference quality of said one or more obtained attributes based on social network properties of said social neighbors.

3. The method of claim 1, wherein said modifying step further comprises the steps of selecting a set of social neighbors and selecting a set of attributes of said selected set of social neighbors.

4. The method of claim 3, wherein said step of selecting a set of social neighbors further comprises the step of selecting social neighbors based on a social influence model.

5. The method of claim 3, wherein said step of selecting a set of social neighbors further comprises the step of selecting social neighbors that are active.

6. The method of claim 3, wherein said step of selecting a set of attributes employs said user attribute correlation model to select a set of unknown attributes of the one or more of said social neighbors to ask the user about using attribute correlation.

7. The method of claim 1, further comprising the step of providing one or more interactions with one or more of said user and said social neighbors to solicit feedback to improve said one or more inferred attributes.

8. The method of claim 1, wherein said user attribute correlation model substantially maximizes a total degree of interests on attributes in said modified inferred set.

9. The method of claim 1, wherein said user attribute correlation model substantially maximizes an overall pair-wise attribute correlation in said modified inferred set.

10. The method of claim 1, wherein said user attribute correlation model prioritizes a smaller size of said modified inferred set.

11. An apparatus for inferring one or more attributes of a user, said apparatus comprising:
    a memory; and
    at least one processor, coupled to the memory, operative to:
    obtain an inferred set of attributes for said user comprised of one or more attributes of social neighbors of said user in a social network:
    predict an accuracy of said obtained inferred set of attributes for said user; and if said predicted accuracy does not satisfy a quality threshold, then modify said inferred set for said user using a user attribute correlation model describing a probability that at least two of said attributes in said inferred set co-occur on any one user among users of said social network.

12. The apparatus of claim 11, wherein said processor is further configured to estimate an inference quality of said one or more obtained attributes based on social network properties of said social neighbors.

13. The apparatus of claim 11, wherein said inferred set is modified by selecting a set of social neighbors and selecting a set of attributes of said selected set of social neighbors.

14. The apparatus of claim 13, wherein said selection of said set of social neighbors further comprises selecting one or more of social neighbors based on a social influence model social neighbors that are active.

15. The apparatus of claim 13, wherein said selection of said set of attributes employs a user attribute correlation model to select a set of unknown attributes of the one or more of said social neighbors to ask the user about using attribute correlation.

16. The apparatus of claim 11, wherein said processor is further configured to provide one or more interactions with one or more of said user and said social neighbors to solicit feedback to improve said one or more inferred attributes.

17. The apparatus of claim 11, wherein said user attribute correlation model substantially maximizes a total degree of interests on attributes in said modified inferred set.

18. The apparatus of claim 11, wherein said user attribute correlation model substantially maximizes an overall pairwise attribute correlation in said modified inferred set.

19. The apparatus of claim 11, wherein said user attribute correlation model prioritizes a smaller size of said modified inferred set.

20. An article of manufacture for inferring one or more attributes of a user, comprising a tangible machine readable storage medium containing one or more programs which when executed implement the step of:

obtaining an inferred set of attributes for said user comprised of one or more attributes of social neighbors of said user in a social network;

predicting an accuracy of said obtained inferred set of attributes for said user; and if said predicted accuracy does not satisfy a quality threshold, then modifying said inferred set for said user using a user attribute correlation model describing a probability that at least two of said attributes in said inferred set co-occur on any one user among users of said social network.

* * * * *